Jan. 21, 1941.   C. H. CURRIER   2,229,405
WELDING METHOD
Filed Sept. 14, 1939
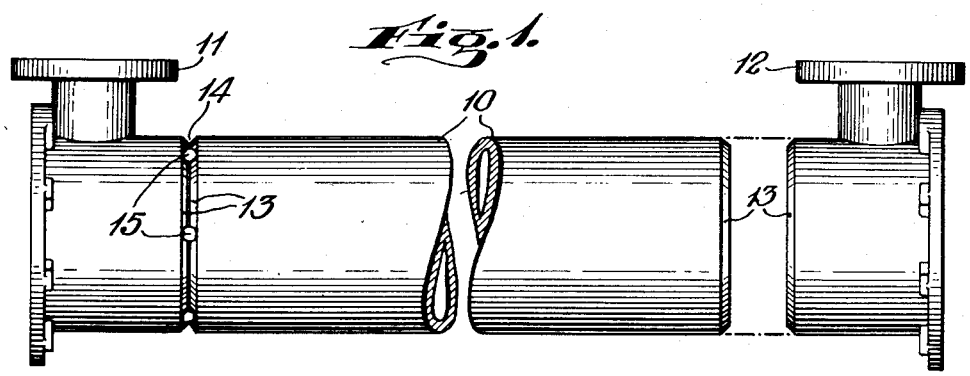
Fig. 1.
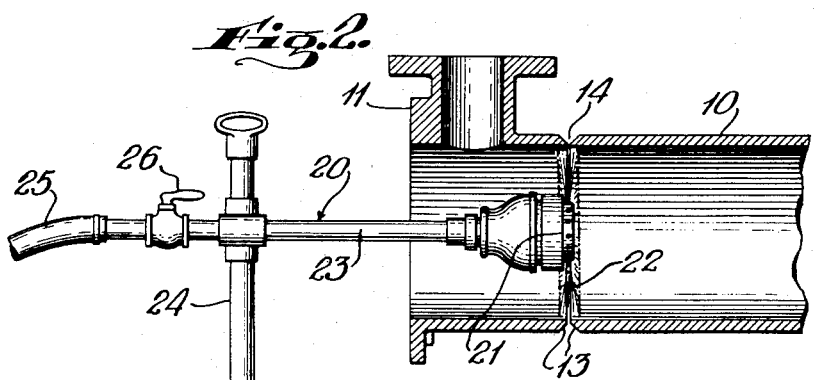
Fig. 2.
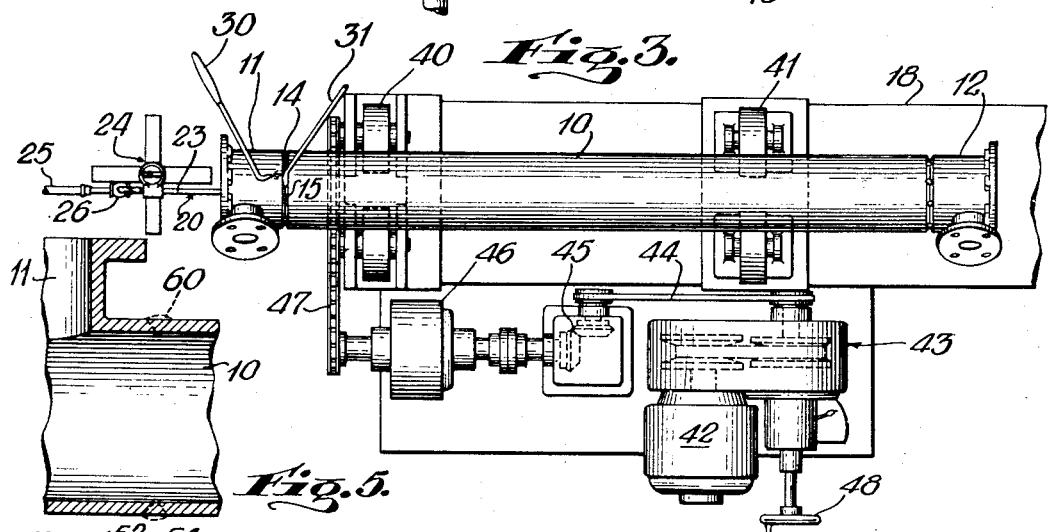
Fig. 3.
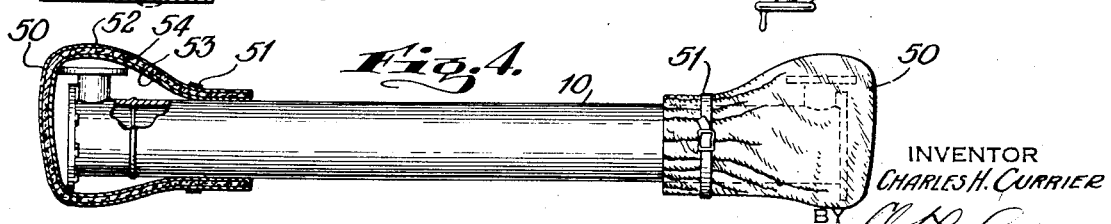
Fig. 5.
Fig. 4.
INVENTOR
CHARLES H. CURRIER
BY
his ATTORNEY Patented Jan. 21, 1941

2,229,405

UNITED STATES PATENT OFFICE 2,229,405

WELDING METHOD

Charles H. Currier, Buffalo, N. Y., assignor to Ross Heater & Manufacturing Company, Inc., Buffalo, N. Y., a corporation of New York Application September 14, 1939, Serial No. 294,857

4 Claims. (Cl. 113—112)

This invention relates to the art of welding and more particularly to methods of welding cast iron parts.

An object of this invention is to provide an improved method of welding cast iron parts, which is extremely simple and easy to carry out and which produces sound welds at a relatively low cost.

As will appear more fully hereinafter, my improved method is particularly useful in the welding of cast iron pipe sections; as an example, in the welding of cast iron hubs to the ends of cast iron shells in the manufacture of heat exchange apparatus. However, I wish it to be understood that in so far as certain of the broader aspects of my invention are concerned, it can be used to advantage in the welding of cast iron parts of various kinds and shapes.

The several steps constituting my improved method will be clearly understood by reference to the accompanying drawing and following description thereof; in which drawing—

Fig. 1 is a side elevational view illustrating certain preliminary steps which may be followed in practicing my improved method;

Fig. 2 is a vertical section illustrating the uniform application of a heating flame to the inside adjoining surfaces of the parts to be welded;

Fig. 3 illustrates, in plan, one way in which the step of depositing the weld metal may be accomplished in accordance with the present invention;

Fig. 4 is a side elevation, partially in section, and illustrating a preferred manner of controlling the rate of cooling of the parts after the weld metal has been deposited; and Fig. 5 is a fragmentary vertical section showing the finished weld.

In the preferred embodiment of my invention which I have elected to disclose, I have shown how the improved method may be used to advantage in the manufacture of heat exchangers. In the drawing, the reference character 10 indicates a cast iron shell and the characters 11 and 12 indicate, respectively, the cast iron hubs which are welded to the opposite ends of the shell in accordance with the present invention.

The adjacent ends of the tubular parts to be welded are first beveled or chamfered as indicated at 13, and the parts are then assembled with the beveled ends in abutting relation so that the adjacent beveled edges form opposite walls of an outwardly opening V-shaped welding groove 14. With the parts in this position and properly alined, they are preferably secured together by tack or spot welding indicated at 15 and located at equally spaced points circumferentially of the groove. In Fig. 1, two different stages in the procedure just described are indicated. At the right-hand end of Fig. 1, the hub 12 and the adjacent end of the shell 10 are shown as having been beveled, preparatory to being secured together. At the left-hand end of Fig. 1, the hub 11 is shown as having been properly alined and secured by spot welding to the adjacent end of the shell to provide the welding groove 14.

During the time that the hubs 11 and 12 are being alined and secured to the opposite ends of the shell 10 in the manner just described, the shell may be conveniently held upon a support 16 (see Fig. 3), where the actual step of permanently welding the parts is accomplished, as will presently appear. However, this is not essential in so far as the broader aspects of my invention are concerned, for if it is desired, the shell and hubs can be alined and tack welded prior to being placed on the support 16.

Before welding parts formed of cast iron, it is essential that such parts and particularly the regions thereof adjacent the groove, be first preheated to relieve the metal adjoining the groove of all stresses inherent in the cast parts. Preferably, the parts are preheated to a temperature between 1100° F. and 1300° F. and in such a manner that the temperature of the metal is uniform in directions extending lengthwise of the groove. At these temperatures, the walls defining the sides of the groove will show a dark red.

In accordance with the present method, the step of preheating the parts to the desired temperature is advantageously accomplished, and in a simple and easy manner, by the uniform application of a heating flame to the inner adjoining surfaces of the hub and shell. This can be done without the need of an expensive heating furnace. A preferred manner in which the heating flame can be uniformly applied to the parts is shown in Fig. 2. The reference character 20 indicates a gas burner having a specially designed radial nozzle 21 from which the flame, indicated at 22, is thrown radially and at a uniform intensity about the entire inner surfaces of the hub and shell. The radial nozzle 21 is supported coaxially of the groove, hub and shell by a gas supply pipe 23 and the latter is carried upon an adjustable supporting member 24, so that the pipe and nozzle may be properly centered with respect to the work and held in that position. The gas is preferably supplied to the pipe 23 and nozzle 21 by a hose 25 made flexible so that the burner may be readily inserted into and withdrawn from the interior of the hub and shell without moving the latter. The intensity of the heating flame may be quickly and accurately regulated by a suitable hand valve 26 located in the gas supply pipe 20, as shown.

After preheating the hub and shell to the desired temperature so as to relieve the cast metal of the stresses inherent therein, the intensity of the heating flame is reduced to provide, in the parts, a holding temperature, and the latter is maintained while the parts are being welded. The holding temperature is just low enough to permit a welding operator to work under satisfactory conditions while depositing the weld metal; yet, it is high enough so that the metal will not be damaged as a result of localized intense heating of the parts by the welding flame while depositing the weld metal, and as a result of too rapid cooling of the area after the weld metal has been deposited. I have found that a holding temperature on the order of 400° F. satisfactorily meets these requirements. It will be understood that the holding temperature on the order of 400° F. is maintained in the metal away from the immediate vicinity of the welding zone. Obviously, the temperature of the metal directly adjacent the welding zone is higher as it is also heated by the high temperature welding flame.

The actual depositing of the weld metal and the fusing of the weld metal and walls of the groove is effected by the application of a welding flame, which may be provided by a conventional oxyacetylene torch 30. The welding flame is applied to the walls of the groove and to a welding rod 31 of suitable characteristics, all in a manner well known to those skilled in the art. In accordance with the present invention, the weld metal is deposited while the holding heat is maintained by the heating flame, as explained above. This is considered to be important for the production of a sound weld; for, if the metal adjacent the groove were not maintained at the holding temperature, the concentrated or localized application of the high temperature welding flame would result in setting up stresses in the metal adjacent the weld. Also, as the welding flame is only applied to a small area of the metal, the temperature of the relatively large mass of metal adjacent the welding zone determines the rate of cooling of the weld metal after it has been deposited. If the adjacent metal were not maintained at the holding temperature, too rapid cooling of the weld would result and this would produce strains in the weld and adjoining areas and would result in cracks and consequently, an unsound weld.

Preferably, the weld metal is deposited at a uniform rate. This is accomplished in the present method by rotating the work at a predetermined desired rate while the operator is depositing the weld metal. As shown in Fig. 3, the support 18 comprises two pairs of rollers 40 and 41 which support the work. The pair of rollers 40 are power driven and the pair of rollers 41 are idlers. The pair of rollers 40 are operated from an electric motor 42 at any desired rate of speed. The shaft of the motor 42 is connected to a variable-speed mechanism 43 of any suitable type, which is in turn connected by a belt 44 and bevel gear set 45 to a constant speed reducing device 46 of any suitable type, which is connected to the pair of rollers 40 by a conventional chain drive 47. By adjusting the wheel 48, the variable-speed mechanism 43 can be regulated to rotate the work at such rate that weld metal may be uniformly and quickly deposited by the operator. The rate will vary in accordance with the size of the shell and thickness of the metal.

After depositing the weld metal, in the manner described, the operator removes the torch 30 and rod 31 and stops the motor 42. The valve 26 is then opened to increase the intensity of the heating flame so as to bring the temperature of the weld and the regions adjacent the weld up to a normalizing or stress-relieving value. I have found that the stresses are removed and the weld properly normalized if the metal be uniformly heated to approximately 850° F. and is held at this temperature for a period approximating 15 minutes. Obviously, variations of these figures can be had without departing from the invention when considered in its broader aspects. The heating flame is then cut off and the burner removed and, immediately thereafter, the welded area and parts adjacent thereto are inclosed by insulating material so as to reduce materially the rate of heat dissipation and thereby assure a sound weld without cracks. While, in so far as the broader aspects of my invention are concerned, different types of heat insulating material may be provided, I have had good results from the use of an asbestos bag or envelope 50 which completely incloses the hubs as well as the welded area and is secured in place by a strap 51. The bag 50 is shown as comprising inner and outer walls 52 and 53 of asbestos cloth with a filling 54 of loose asbestos or any other suitable insulating material between the walls. The bag 50 closes the open end of the hub and thereby prevents cooling air currents from passing through the interior of the hub and shell. I have found that better results are obtained when the heat insulation of the welded area is such that the rate of heat dissipation does not exceed 100° F. per hour and when the bag 50 is left on for a period of ten hours or more. The bag-like inclosure is well suited for the purpose described, as it may be constructed to definite specifications so that it will assure the proper rate of cooling; and furthermore, the bag may be used repeatedly and thereby assure a uniform high character of weld.

After the work has cooled sufficiently, the bag 50 is removed and the surplus weld metal ground down in the well known manner. Fig. 5 shows the completed weld. The dotted area 60 indicates the surplus metal which has been ground away.

From the above, it will be apparent that I have produced a method of welding parts formed of cast iron which is extremely simple and can be easily carried out in a minimum of time. Furthermore, the method is such that good welds of uniform soundness can be produced at a low cost. One of the main contributing factors to the low cost of welds produced in accordance with the present invention, is that the apparatus required to practice the invention can be simple and inexpensive. Furthermore, a minimum amount of time-consuming handling of the work is required. No expensive heating or annealing furnace is required. Also, the method is faster as it can be carried out by continuous action. The step of depositing the metal does not have to be interrupted and the work placed back in a furnace for reheating. The acts of preheating, maintaining the work at a satisfactory holding temperature, and of normalizing the weld and adjacent metal, are all accomplished by one heating flame which is applied at uniform intensity about the welding area. The flame can be easily and accurately regulated to suit different conditions. The heating flame is advantageously separate from the welding flame and is applied to the underside or back of the groove, thereby permitting a higher holding temperature without discomfort to the operator.

In addition to the above advantages, my improved method makes possible the practical production by welding methods of heat exchangers having cast iron shells and hubs. The cost of producing heat exchangers of this type by my improved method is well below the cost of production by prior welding methods. Also, the manufacturing cost of heat exchangers produced in accordance with my method is less than that of prior practices wherein welding is not employed and a separate pattern is required for each length of heat exchanger.

What I claim and desire to secure by Letters Patent of the United States is:

1. A method of welding the ends of two cast iron pipe sections which comprises arranging the sections with said ends in abutting relation to provide therebetween an outwardly opening welding groove; uniformly applying a heating flame directly to the inner surfaces of the pipe ends at both sides of the welding groove to raise the temperature of the metal defining and adjacent the groove to a red heat; reducing the intensity of the heating flame to maintain the regions adjacent the groove at a holding temperature sufficient to prevent damage resulting from localized heating at welding temperatures and from too rapid cooling after welding; welding the abutting ends, while said heating flame is being applied to provide said holding temperature, by progressively depositing molten weld metal in the groove from the outside and, at the same time, fusing the walls of the groove and the weld metal by the application of a welding flame; removing said welding flame after the weld has been made and then increasing the intensity of said heating flame to bring the weld and the regions adjacent the weld to a stress-relieving temperature; and removing said heating flame and immediately thereafter thermally insulating the weld and the regions adjacent the weld to retard the cooling rate of the weld and thereby prevent damage thereto.

2. A method of welding the ends of two cast iron pipe sections which comprises arranging the sections with said ends in abutting relation to provide therebetween an outwardly opening welding groove; uniformly applying a heating flame directly to the inner surfaces of the pipe ends at both sides of the welding groove to raise the temperature of the metal defining and adjacent the groove to a red heat; reducing the intensity of the heating flame to maintain the regions adjacent the groove at a holding temperature sufficient to prevent damage resulting from localized heating at welding temperatures and from too rapid cooling after welding; welding the abutting ends, while said heating flame is being applied to provide said holding temperature, by progressively depositing molten weld metal in the groove from the outside and, at the same time, fusing the walls of the groove and the weld metal by the application of a welding flame; removing said welding flame after the weld has been made and then increasing the intensity of said heating flame to bring the weld and the regions adjacent the weld to a stress-relieving temperature; and removing said heating flame and immediately thereafter inclosing one of said pipe sections, the weld and the regions adjacent the weld in an envelope of insulating material to retard the cooling rate of the weld and thereby prevent damage thereto.

3. A method of welding the ends of two cast iron pipe sections which comprises arranging the sections with said ends in abutting relation to provide therebetween an outwardly opening welding groove; uniformly applying a heating flame directly to the inner surfaces of the pipe ends at both sides of the welding groove to raise the temperature of the metal defining and adjacent the groove to a red heat; reducing the intensity of the heating flame to maintain the regions adjacent the groove at a holding temperature sufficient to prevent damage to the metal from localized heating at welding temperature and from too rapid cooling after welding; welding thhe abutting ends, while maintaining by the heating flame the regions adjacent the groove at said holding temperature, by depositing molten weld metal in the groove and, at the same time, fusing the walls of the groove and the weld metal by the application of a welding flame; rotating the pipe sections while welding, at such a rate that the weld metal is deposited uniformly and progressively along the groove; removing said welding flame after the weld has been made and then increasing the intensity of said heating flame to bring the weld and regions adjacent the weld to a stress-relieving temperature; and removing said heating flame and immediately thereafter thermally insulating the weld and the regions adjacent the weld to retard the cooling rate of the weld and thereby prevent damage thereto.

4. A method of welding two cast iron parts which comprises arranging the parts with the surfaces to be joined in juxtaposed relation to provide therebetween a welding groove having an opening at one side for the reception of the weld metal; uniformly applying a heating flame to said cast iron parts adjacent the welding groove and at the side opposite said opening to increase the temperature of the metal defining and adjoining the groove to a red heat; reducing the intensity of the heating flame to maintain the metal defining and adjoining the groove at a holding temperature sufficient to prevent damage to the metal from localized heating at welding temperatures and from too rapid cooling after welding; welding the parts, while said heating flame is being applied to provide said holding temperature, by depositing weld metal through said opening into the groove and, at the same time, fusing the surfaces defining the groove and the weld metal by the application of a welding flame applied through said opening; removing said welding flame and then increasing the intensity of said heating flame to bring the weld and the regions adjacent the weld to a stress-relieving temperature; and removing said heating flame, and immediately thereafter inclosing the weld and the regions adjacent the weld in insulating material to prevent heat dissipation at a rate likely to damage the weld.

CHARLES H. CURRIER.